Figure 1:
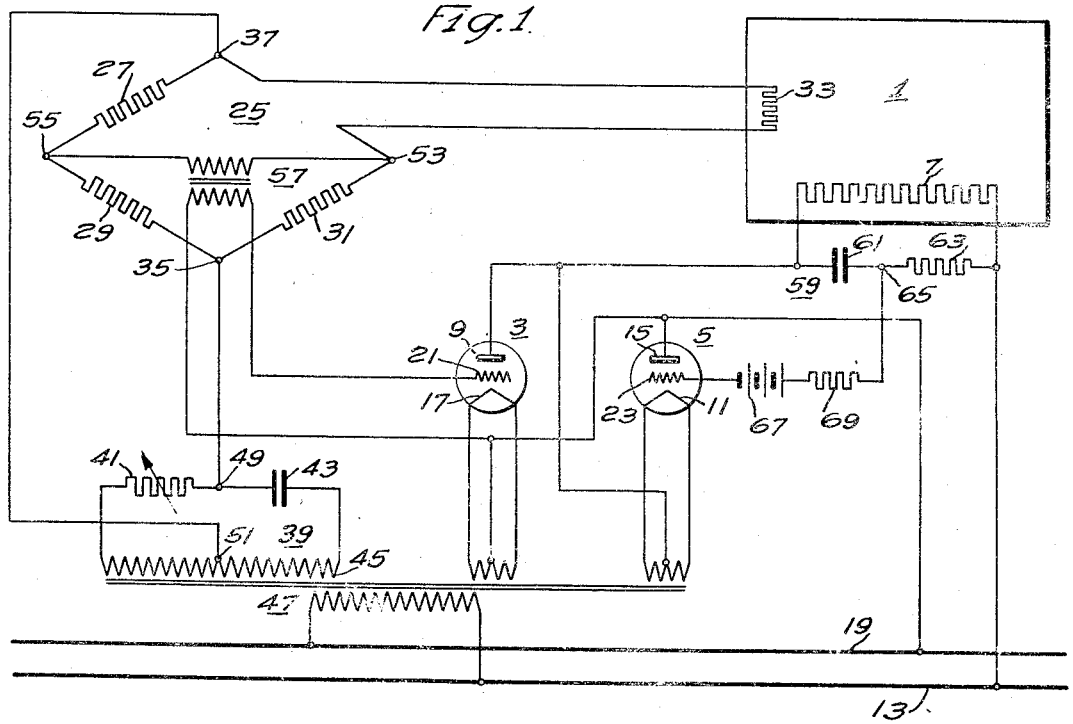

Aug. 9, 1938.   D. D. KNOWLES   2,126,398

ELECTRIC DISCHARGE APPARATUS

Filed Oct. 3, 1935

WITNESSES:
E. A. McCloskey
Hymen Diamond

INVENTOR
Dewey D. Knowles.
BY
F. W. Lyle
ATTORNEY

Patented Aug. 9, 1938

2,126,398

UNITED STATES PATENT OFFICE 2,126,398

ELECTRIC DISCHARGE APPARATUS

Dewey D. Knowles, Wilkinsburg, Pa., assignor to Westinghouse Electric & Manufacturing Company, East Pittsburgh, Pa., a corporation of Pennsylvania Application October 3, 1935, Serial No. 43,361

25 Claims. (Cl. 250—27)

My invention relates to energy translating apparatus and it has particular relation to translating apparatus in which the power supply is varied by the operation of a plurality of electric discharge devices.

It is an object of my invention to provide apparatus for supplying variable alternating current, the positive and negative half waves of which are of equal polarity, to energize a translating device.

Another object of my invention is to provide apparatus for so energizing a magnetic load that it shall not be magnetically saturated.

A further object of my invention is to provide apparatus for supplying variable power to a load through a plurality of discharge devices; the excitation of one of the discharge devices being externally controlled and the excitation of another being effected by the excitation of the first-mentioned discharge device.

More concisely stated, it is an object of my invention to provide a system incorporating a plurality of electric discharge devices which shall be so connected that a predetermined interval of time after one of the discharge devices is energized it causes a second discharge device to be energized; the timing of the excitation being such that equal pulses of current are delivered by the discharge devices.

According to my invention, I provide apparatus incorporating electric discharge devices of the type having control electrodes. An external control circuit is provided for controlling the excitation of one of the discharge devices. This discharge device supplies the translating apparatus. Across the translating apparatus an impedance is connected. The impedance is also connected between the control electrode and a principal electrode of another discharge device and as the potential drop across the impedance varies under the influence of the first discharge device, the excitation of the second discharge device is varied.

When alternating current is to be supplied to a non-reactive translating device, the connection of the anode-cathode circuit of one of the discharge devices is opposite to that of the other discharge device. The energizing control potential for the externally-controlled discharge device is adjusted in such manner that the discharge device passes current throughout the half cycle of positive anode-cathode potential applied thereto. The impedance coupled to the other discharge device is moreover of such character that the discharge device is energized at the beginning of a positive half cycle of principal potential applied thereto.

When the translating device is of the reactive type, the phase relationship between initiating control potential for the first discharge device and the potential applied between its anode and cathode is equal to the power factor angle. In such a case, the second discharge device automatically follows the first discharge device in the proper phase relationship.

The discharge devices that I prefer to utilize in the practice of my invention are of the gas or vapor discharge type. Discharge devices of this type have abrupt characteristics and are either normally completely energized or completely deenergized. The discharge devices utilized may be hot cathode devices, in which a rarefied gas, such as neon, or a vapor such as mercury vapor is present in the envelope. They may also be discharge devices of the cold-cathode or mercury-pool cathode type. In the latter case, I prefer to utilize discharge devices in which the normal control element utilized in hot cathode devices is replaced by a high resistance starting electrode which is immersed in the mercury or other vaporizable electrode and through which a current is transmitted to initiate a discharge between the anode and cathode.

While the gas filled discharge devices are to be utilized in the preferred practice of my invention, I do not intend that the scope of my invention should be limited to apparatus incorporating only such discharge devices. Where high vacuum discharge devices are utilized in practicing my invention, such use is within the scope of my invention.

In the following discussion I shall refer to the principal potential as the potential impressed between the principal electrodes of a discharge device. If the conductivity of the discharge device is asymmetric the principal electrodes are the anode and cathode. I shall, moreover, refer to the control potential as the potential impressed between the control electrode and one of the principal electrodes, usually the cathode. The control potential above which the discharge device is energized and below which remains deenergized I shall designate as the limiting control potential or the critical control potential.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing, in which Fig. 1 is a diagrammatic view showing an embodiment of my invenetion, and Fig. 2 is a diagrammatic view showing a modification of my invention.

Figure 2:
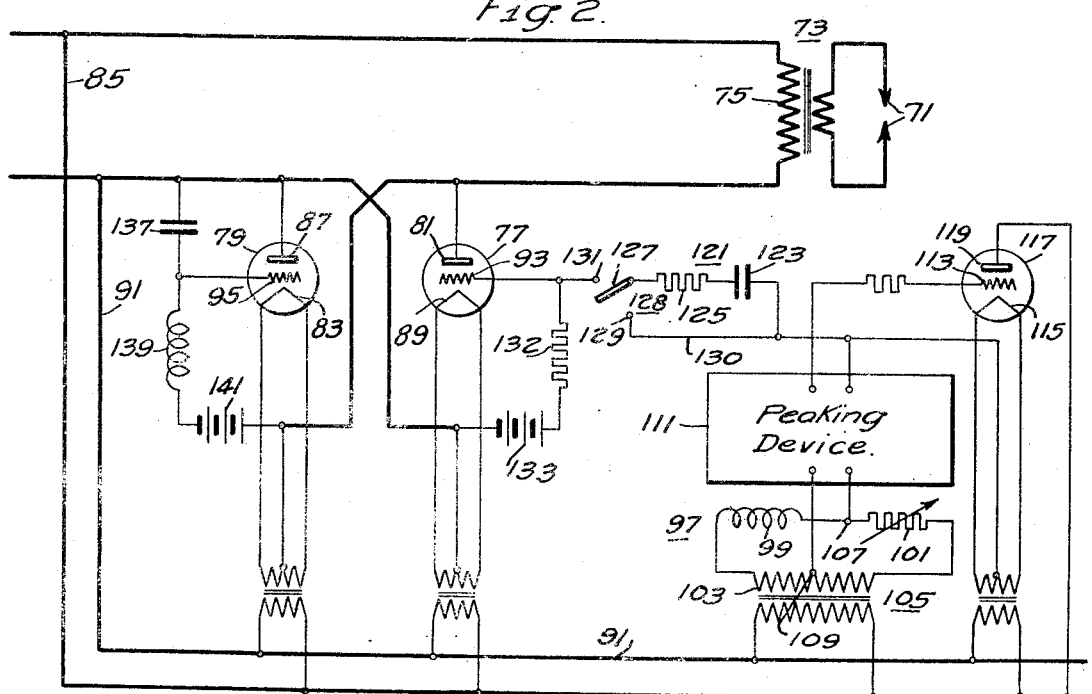

In Fig. 1, my invention is shown as applied to control the energy supplied to a resistance heater 1. The temperature of the heater is varied by supplying current through a plurality of discharge devices 3 and 5 to a resistance element 7. The discharge devices 3 and 5 are supplied with potential from an alternating source (not shown). The anode 9 of one discharge device 3 and the cathode 11 of the other 5 are connected to one terminal 13 of the source through the resistance element 7 while the anode 15 of the second discharge device 5 and the cathode 17 of the first discharge device are directly connected to the other terminal 19 of the source.

It is desirable that the heater 1 be maintained at a predetermined temperature. For this reason, the current supplied to the heating element 7 is varied by varying the intervals during which the discharge devices 3 and 5 are energized and deenergized.

The discharge devices 3 and 5 are provided with control electrodes 21 and 23 respectively. The control electrode 21 of the discharge device 3 is supplied from a detecting system which is responsive to the temperature variations of the heater 1 and may be of any general type. In the apparatus shown, it comprises a Wheatstone bridge 25 having three fixed resistance arms 27, 29 and 31 and a variable arm comprising a resistor 33, the magnitude of which varies with the temperature. The resistor 33 is disposed in the heater 1 and as the heater temperature varies, the balance of the bridge is varied.

Two of the opposite terminals 35 and 37 of the bridge 25 are supplied with alternating potential from the main source through a phase shifting network 39. The latter comprises a variable resistor 41 and a capacitor 43 connected across a secondary section 45 of a transformer 47 supplied from the main source. In accordance with the usual practice, the terminals 35 and 37 of the bridge are respectively connected to the junction point 49 of the capacitor 43 and resistor 41 and an intermediate tap 51 of the secondary section 45.

The potential output between the remaining opposite terminals 53 and 55 of the bridge 25 is coupled between the control electrode 21 and the cathode 17 of the discharge device 3 through a suitable transformer 57. As the temperature of the heater 1 is varied in a predetermined sense, the potential between the output terminals 53 and 55 of the bridge 25 increases or decreases and the discharge device 3 is controlled. The phase shift network 39 is preferably, though not necessarily, so adjusted that the potential supplied between the input terminals 35 and 37 of the bridge 25 and, therefore, the potential output of the bridge, is displaced 90° in phase with reference to the potential of the source. The same phase displacement is carried over with reference to the principal potential supplied to the discharge device 3. The polarity of the phase shift is such that the most positive control potential is applied to the discharge device at the instant that positive principal potential is applied thereto. The bridge 25 is so adjusted that if the heater temperature is low, the control potential supplied has a value of sufficient magnitude to energize the discharge device 3 at the beginning of a postive half-cycle of principal potential. If the temperature of the heater 1 is high the control potential at the beginning of the half-cycle is of such low value that the discharge device remains unenergized.

The discharge device 5 is energized from the discharge device 3 and also at the beginning of its positive half cycle of principal potential which is the negative half-cycle for the discharge device 3. To control the excitation of the discharge device 5 I provide a network 59 comprising a capacitor 61 and a resistor 63 connected in series with each other. The network 59 is connected cross the heating element 7. The junction point 65 of the capacitor 61 and resistor 63 is connected to the control electrode 23 of the discharge device 5 through a suitable biasing battery 67 and a suitable resistor 69 while the capacitor 61 is connected directly to the cathode 11.

The biasing battery 67 functions to maintain the discharge device 5 normally deenergized. However, when the discharge device 3 is energized, a certain portion of the current flowing through the heater 7 is shunted through the network 59 and a charge is built up on the capacitor 61. The capacitor 61 is so connected in the principal circuit of the discharge device 3 and the control circuit of the device 5 that the plate which is charged positive is connected to the control electrode of the discharge device 5 and the negative plate to the cathode thereof. It thus happens that when the capacitor 61 is charged from the discharge device 3 for a predetermined interval of time, the difference of potential impressed on the capacitor neutralizes the biasing potential of the battery 67 and causes the first discharge device to become energized and to supply a half wave of current to the resistance element 7. The resistor 63 in series with the capacitor 61 is so adjusted that the capacitor is sufficiently charged to energize the second discharge device at the beginning of its positive half cycle of principal potential. For this reason, it happens that the current supplied during one half cycle through the discharge device 3 is equal to the current supplied during the succeeding half cycle through discharge device 5 just as would be the case if the heating element were supplied directly with alternating current.

To understand the operation of the apparatus, assume first that the heater is cold. When power is applied to the apparatus, a pulse of potential is impressed between the control electrode 21 and the cathode 17 of the discharge device 3, which is of sufficient magnitude to energize discharge device 3 since the resistance thermometer 33 is cold. Current is transmitted between the principal electrodes 9 and 17 of the discharge device 3 and through the heating element 7. This is followed by a pulse of current from the discharge device 5. The discharge devices 3 and 5 continue to pass current until the temperature of the heater 1 attains the desired value. When this value is attained, the resistance of the thermometer 33 is so charged that the pulses of potential impressed between the control electrode 21 and the cathode 17 of the discharge device 3 leave the discharge device in unenergized condition. Since the discharge device 5 depends for its excitation on the discharge device 3, it also is deenergized and the current to the heating element 7 is interrupted until the heater 1 cools sufficiently to require further excitation.

In Fig. 2, my invention is shown as applied to a spot welding or seam welding system. The work piece which is to be welded is inserted between the plurality of electrodes 71 and a large current is short circuited through the electrodes. To obtain the large current, a step down transformer 73 is provided through the primary 75 of which pulses of current corresponding to the welding spots are transmitted. To properly time the pulses, a plurality of discharge devices 77 and 79 are utilized. Since the welding transformer 73 is customarily provided with a soft iron core saturation of the iron is to be avoided, and for this reason the discharge devices 77 and 79 are so connected and so energized that equal half waves of current of opposite polarity are transmitted through the primary 75. The discharge devices 77 and 79 utilized in the modification shown are of the hot cathode gas filled type. Such discharge devices may be utilized where moderately large current is sufficient. If the current is to be of the order of thousands of amperes, however, it is preferable that discharge devices of the Ignitron type be utilized.

As in the apparatus shown in Fig. 1, the anode 81 of one discharge device 77 and the cathode 83 of the other 79 are connected to one terminal 85 of the source (not shown) through the primary 75 of the welding transformer 73. The anode 87 of the second discharge device 79 and the cathode 89 of the first 77 are connected to the other terminal 91. The discharge devices 77 and 79 are provided with control electrodes 93 and 95. The excitation of the discharge device 77 is externally controlled, by varying its control potential.

To regulate the supply of control potential for the discharge device 77 a phase shift network 97 comprising a reactor 99 and a resistor 101 is provided. The network 97 is supplied with potential from the secondary 103 of a transformer 105 which is in turn energized from the main source. The junction point 107 of the reactor 99 and the resistor 101 and an intermediate tap 109 of the secondary 103 of the transformer 105 are connected to a peaking device 111 such, for example, as a saturable transformer. By a peaking device I mean a device which converts sinusoidal potential waves into waves having a peaked wave form. Waves of peaked wave form are necessary in the present connection to make certain that the discharge device 77 is energized if at all at only a single precisely predetermined point in each half cycle of principal positive potential. If a saturable transformer is utilized, the primary of the transformer is connected to the junction points 107 and 109.

The output terminals of the peaking device 111 are connected between the control electrode 113 and the cathode 115 of an auxiliary discharge device 117 which may be either of the high-vacuum or gas-filled type. The anode 119 of the auxiliary discharge device 117 is directly connected to the terminal 85 of the source while its cathode 115 is connected to a network 121 comprising a capacitor 123 and a resistor 125 in series with each other. The movable contactor 127 of a switching element 128 is connected to the resistor. When the contactor 127 engages a fixed contact 129, the resistor 125 is connected to a conductor 130 which short circuits the network 121. When the movable contactor 127 is connected to another fixed contact 131, the resistor 125 is connected to the terminal 91 of the source through the control electrode 93 and the cathode 89 of discharge device 77 and through a parallel path including another resistor 132 and a biasing battery 133 for the discharge device 77.

The illustration of the element 128 is entirely symbolical. It is to be taken as indicating either an ordinary switch or the timing contactor which is customarily utilized for controlling the excitation of spot welding or seam welding equipment.

When the discharge device 77 is deenergized and the contactor 127 engages the fixed contact 131, the circuit between the control electrode 93 and the cathode 89 is open and the capacitor and resistor network 121 is connected to the power source only through the second resistor 132 and the battery 133. In such a case, if the proper energizing potential is supplied to the auxiliary discharge device 117, current is transmitted through the auxiliary discharge device 117, the capacitor 123, the first resistor 125 and the second resistor 132 to the remaining terminal 91 of the source. Since the current is transmitted through the resistor 132 in the control circuit of the discharge device 77, a potential is impressed between the control electrode 93 and the cathode 89 of the discharge device 77 which causes the discharge device to be energized. When the discharge device 77 is energized, a pulse of current is transmitted through the primary 75 of the welding transformer.

To obtain a pulse of the opposite polarity, the discharge device 79 is provided. Between the control electrode 95 and the anode 87 of the latter discharge device a capacitor 137 is connected. Between the control electrode 95 and the cathode 83 an inductor 139 is connected through a suitable biasing battery 141.

While I have shown a capacitor 137 and an inductor 139 connected as indicated, my invention is not to be limited to these elements. The elements are, however, shown in the form advisedly. The essential requirement is that the reactor 137 connected between the control electrode 95 and the anode 87 should offer high impedance to the frequency of the source and low impedance to surges, while the other reactor 139 should offer low impedance to the frequency of the source and high impedance to surges. From the above consideration, it will be seen that either single reactors or groups of reactors of any general type may be utilized. However, in many cases I have found that the reactors shown are preferable.

It is to be noted that the discharge device 77 is connected in shunt with the reactors. Moreover, the load 73 supplied is of the highly inductive type. When current is supplied through the discharge device 77 to the load and the half cycle of potential supplied to the discharge device 77 from the source is reversed, the current will continue to flow by reason of the reactive effect of the load. The negative potential of the source on the other hand will continue to increase as the current continues to flow. After the reactive effect is exhausted, the current through the discharge device 77 is interrupted and since the discharge device 77 then becomes open circuited, the full potential of the source, which is now considerable, is impressed across it and across the reactors 137 and 139 in parallel with it. Since the capacitor offers low impedance to surges and the inductor high impedances to surges, the potential of the control electrode 95 of the discharge device 79 approaches that of the anode and the discharge device is energized. It is to be noted that the point in the half cycle of negative principal potential supplied to the discharge device 77 on positive principal potential supplied to discharge device 79 at which the reactive effect is exhausted and the discharge device 77 is deenergized is dependent on the power factor of the load 73. The deenergization of discharge device 77 lags the beginning of the half wave of negative source potential by the power factor angle. It thus happens that when the discharge device 77 is energized, the discharge device 79 is subsequently energized, the excitation of the latter lagging with reference to its half cycle of principal positive potential by the power factor angle.

The phase shift network 97 is utilized to provide for the supply of equal half waves of positive and negative current to the welding transformer 73. It is so adjusted that a pulse of energizing control potential is supplied to the auxiliary discharge device 117 at an instant which lags the initiation of a pulse of positive principal potential for the main discharge device 77 by the power factor angle. At this instant, therefore, a pulse of current is transmitted through the capacitor 123 to energize the discharge device 77. After the discharge device 77 is energized and deenergized, the second discharge device follows it in the proper phase relationship, since the energizing surge of potential also depends on the power factor angle of the load. The proper phase adjustment of the phase shifting network 97 may be determined by passing current through the welding transformer 73 and reading on a suitable meter the extent of saturation of the transformer. The adjustment is varied until the saturation reads zero.

To eliminate any dangerous condition which might arise from the charged capacitor 123 in series with the auxiliary discharge device 117, the control switch 128 is provided with the alternative fixed contact 129 whereby the capacitor 123 is short circuited.

It is to be noted that when the control switch 128 is in the operative position, the capacitor 123 is charged and cannot be discharged. This circuit arrangement has the advantage that only a predetermined number of pulses may be transmitted through the resistor in the control circuit of the main discharge device 77 after the control switch 128 is in its operative position. If the control switch 128 should by reason of any defect in the apparatus or by the carelessness of the operator be left in its operative position for a considerable interval of time, the materials to be welded would not be burned, since after the capacitor 123 is charged, the flow of charging current is interrupted and the main discharge devices 77 and 79 are deenergized.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. Apparatus for energizing a substantially non-reactive translating device comprising a source of alternating potential, a discharge device having a control electrode and a plurality of principal electrodes, said principal electrodes being immersed in a gaseous medium and the conductivity between said principal electrodes being asymmetric, means for impressing an alternating potential from said source between said principal electrodes, a source of periodic potential, means for impressing a periodic potential from the last said source between said control electrode and one of said principal electrodes in such manner that the maximum positive potential is impressed between said control electrode and the last said principal electrode substantially simultaneously with the initiation of a positive half wave of potential between said principal electrodes, a second electric discharge device having a control electrode and a plurality of principal electrodes, said principal electrodes being immersed in a gaseous medium and the conductivity between said principal electrodes being asymmetric, means for impressing an alternating potential from said first-named source between the principal electrodes of said last-named discharge device in opposite phase to the potential impressed between the principal electrodes of said first-named discharge device, means coupled to a control electrode and a principal electrode of said last named discharge device for supplying a potential between the last said electrodes, means for coupling the last said means to said first-named discharge device in such manner that the last said potential is dependent on the current supplied by said first-named discharge device, the coupling means between said potential supply means and said discharge devices being such that when said first-named device is energized the potential impressed by said potential supply means on said last-named discharge device has a sufficient value to energize said last-named discharge device substantially at the beginning of a positive half-cycle of principal potential impressed thereon and means for coupling said discharge devices to said translating device in such manner that alternating current is supplied therethrough to said translating device.

2. Apparatus for energizing a translating device comprising a source of alternating potential, a discharge device having a control electrode and a plurality of principal electrodes, said principal electrodes being immersed in a gaseous medium and the conductivity between said principal electrodes being asymmetric, means for impressing an alternating potential from said source between said principal electrodes, a source of periodic potential, means for impressing a periodic potential from the last said source between said control electrode and one of said principal electrodes, a second discharge device having a control electrode and a plurality of principal electrodes, said principal electrodes being immersed in a gaseous medium and the conductivity between said principal electrodes being asymmetric, means for impressing an alternating potential from said first-named source between the principal electrodes of said last-named discharge device in opposite phase to the potential impressed between the principal electrodes of said first-named discharge device, means coupled to a control electrode and a principal electrode of said last-named discharge device for supplying a potential between the last said electrodes, means for coupling the last said means to said first-named discharge device in said manner that the last said potential is dependent on the current supplied by said first-named discharge device, the coupling means between said potential-supply means and said discharge devices being such that beginning with the first half-cycle during the interval during which said discharge devices are energized, when said first-named device is energized the potential impressed by said potential supply means on said last-named discharge device has a sufficient value to energize said last-named discharge device substantially at the same point in its positive half-cycle of principal potential as the point in the preceding half-cycle of principal potential supplied to the first-named discharge device at which said first-named discharge device was energized and means for coupling said discharge devices to said translating device in such manner that alternating current is supplied therethrough to said translating device.

3. Apparatus for energizing a translating device comprising a source of alternating potential, a discharge device having a control electrode and a plurality of principal electrodes, said principal electrodes being immersed in a gaseous medium and the conductivity between said principal electrodes being asymmetric, means for impressing an alternating potential from said source between said principal electrodes, a source of periodic potential, means for impressing a periodic potential from the last said source between said control electrode and one of said principal electrodes, a second electric discharge device having a control electrode and a plurality of principal electrodes, said principal electrodes being immersed in a gaseous medium and the conductivity between said principal electrodes being asymmetric, means for impressing an alternating potential from said first-named source between the principal electrodes of said last-named discharge device in opposite phase to the potential impressed between the principal electrodes of said first-named discharge device, means coupled to a control electrode and a principal electrode of said last-named discharge device for supplying a potential between the last said electrodes, means for coupling the last said means to said first-named discharge device in such manner that the last said potential is dependent on the current supplied by said first-named discharge device, the means for impressing potential between the control electrodes and the principal electrodes of said discharge devices being such that, beginning with the first half cycle during the interval during which said discharge devices are energized, successive half waves of current supplied through said discharge devices when they are energized are of substantially equal amplitude.

4. Apparatus according to claim 3 characterized by that the contrivance for adjusting the control potentials impressed on the discharge devices to values such that the successive half waves of current supplied through said discharge devices during successive half cycles of potential are of substantially equal amplitude includes a means for shifting the phase of the periodic potential relative to the alternating potential.

5. Apparatus for energizing a translating device having a power factor angle comprising a source of alternating potential, a discharge device having a control electrode and a plurality of principal electrodes, said principal electrodes being immersed in a gaseous medium and the conductivity between said principal electrodes being asymmetric, means for impressing an alternating potential from said source between said principal electrodes, a source of periodic potential, means for impressing a periodic potential from the last said source between said control electrode and one of said principal electrodes, a second electric discharge device having a control electrode and a plurality of principal electrodes, said principal electrodes being immersed in a gaseous medium and the conductivity between said principal electrodes being asymmetric, means for impressing an alternating potential from said first-named source between the principal electrodes of said last-named discharge device in opposite phase to the potential impressed between the principal electrodes of said first-named discharge device, means coupled to a control electrode and a principal electrode of said last-named discharged device for supplying a potential between the last said electrodes, means for coupling the last said means to said first-named discharge device in such manner that the last said potential is dependent on the current supplied by said first-named discharge device, the means for impressing potential between the control electrodes and the principal electrodes of said discharge devices being such that said discharge devices are energized at points in the positive half-cycles of principal potential which deviate from the point of zero potential by an angle corresponding to the power-factor angle of said translating device.

6. Apparatus according to claim 5 characterized by the provision of means for converting said periodic potential waves into waves of peaked wave form.

7. Apparatus for energizing a translating device comprising a source of alternating potential, a discharge device having a plurality of principal electrodes, said principal electrodes being immersed in a gaseous medium and the conductivity between said principal electrodes being asymmetric, means for impressing an alternating potential from said source between said principal electrodes, means for controlling the excitation of said discharge device, a second electric discharge device having a control electrode and a plurality of principal electrodes, said principal electrodes being immersed in a gaseous medium and the conductivity between said principal electrodes being asymmetric, means for impressing an alternating potential from said first-named source between the principal electrodes of said last-named discharge device in opposite phase to the potential impressed between the principal electrodes of said first-named discharge device, means coupled to a control electrode and a principal electrode of said last-named discharge device for supplying a potential between the last said electrodes, means for coupling the last said means to said first-named discharge device in such manner that the last said potential is dependent on the current supplied by said first-named discharge device, the means for impressing potential between the control electrode and the principal electrode of said last-named discharge device being such that beginning with the first cycle during the interval during which said discharge devices are energized, successive half waves of current supplied through said discharge devices when they are energized are of substantially equal amplitude, and means for coupling said discharge devices to said translating device in such manner that alternating current is supplied therethrough to said translating device.

8. Apparatus for supplying energy to a translating device comprising a source of periodic potential, an electric discharge device having a plurality of principal electrodes, means for impressing a potential from said source between said principal electrodes, a second electric discharge device, the last said discharge device having a control electrode and a plurality of principal electrodes, means for impressing potential from said source between the last said principal electrodes which is in opposite phase to the potential impressed between the principal electrodes of said first-named discharge device, means for connecting said first-named discharge device to supply current of one polarity to said translating device and said last-named discharge device to supply current of the opposite polarity to said translating device, a circuit including a capacitor connected in shunt with said translating device, means for coupling said capacitor between said control electrode and a principal electrode of said last-named discharge device and connections between said capacitor and said first-named discharge device providing for the deposit of a positive charge on the plate of said capacitor which is coupled to said control electrode.

9. In combination a source of periodic potential, an electric discharge device having a plurality of principal electrodes, means for impressing a potential from said source between said principal electrodes, a second electric discharge device, the last said discharge device having a control electrode and a plurality of principal electrodes, means for impressing potential from said source between the last said principal electrodes which is in opposite phase to the potential impressed between the principal electrodes of said first-named discharge device, a circuit including a capacitor connected in series with the principal electrodes of said first-named discharge device, means for coupling said capacitor between said control electrode and a principal electrode of said last-named discharge device and connections between said discharge devices providing for the deposit of a positive charge on the plate of said capacitor which is coupled to said control electrode and a negative charge on the plate coupled to the principal electrode when said first-named discharge device is passing current.

10. Apparatus according to claim 9 characterized by a first named discharge device having a control electrode and means for impressing potentials between the control electrode and a principal electrode of said first-named device for varying the excitation thereof.

11. Apparatus according to claim 9 characterized by that the first-named discharge device has a control electrode, the principal electrodes of each discharge device are immersed in a gaseous medium and means is provided for impressing potentials between the control electrode and a principal electrode of said first-named discharge device to vary the excitation thereof.

12. In combination a source of potential, an electric discharge device having a control electrode and a plurality of principal electrodes, said principal electrodes being immersed in a gaseous medium, a reactance having a high impedance to the steady potential of said source and a low surge impedance connected between said control electrode and one of said principal electrodes, a second discharge device having principal electrodes, means connecting the principal electrodes of said second discharge device to shunt said reactance and means for abruptly varying the excitation of said last-named discharge device whereby abrupt potentials are applied between the terminals of said reactance.

13. In combination a source of potential, an electric discharge device having a control electrode and a plurality of principal electrodes, said principal electrodes being immersed in a gaseous medium, a reactance having a high impedance to the steady potential of said source and a low surge impedance connected between said control electrode and one of said principal electrodes, a reactance having a low impedance to the steady potential of said source and a high surge impedance connected between said control electrode and another principal electrode, a second discharge device having principal electrodes, means connecting the principal electrodes of said second discharge device in shunt with said reactances and means for abruptly varying the excitation of said last-named discharge device whereby abrupt potentials are applied between the terminals of said reactance.

14. Apparatus for supplying power to a reactive load comprising a source of potential, an electric discharge device having a control electrode and a plurality of principal electrodes, said principal electrodes being immersed in a gaseous medium, a reactance having a high impedance to the steady potential of said source and a low surge impedance connected between said control electrode and one of said principal electrodes, a second discharge device having principal electrodes, means connecting the principal electrodes of said second discharge device in circuit with said load and in shunt with said reactance and means for varying the excitation of said last-named discharge device.

15. Apparatus according to claim 12 characterized by that the source supplies periodic potential, the potential falling to such low values that the first-named discharge device, if energized, may be deenergized.

16. Apparatus according to claim 12 characterized by that the last-named discharge device is of the gas-filled type and the source supplies periodic potential, the potential falling to such low values that the discharge devices, if energized, may be deenergized.

17. In combination a source of potential, an electric discharge device having a control electrode and a plurality of principal electrodes, said principal electrodes being immersed in a gaseous medium, a reactance having a low impedance to the steady potential of said source and a high surge impedance connected between said control electrode and one of said principal electrodes, a second discharge device having principal electrodes, means connecting the principal electrodes of said second discharge device in shunt with said reactance and means for abruptly varying the excitation of said last-named discharge device in such manner that abrupt potentials are applied between the terminals of said reactance.

18. Apparatus according to claim 12 characterized by that the last named discharge device has a control electrode and its principal electrodes are immersed in a gaseous medium and means coupled between the control electrode and one of the principal electrodes of the last-named discharge device to control its excitation.

19. Apparatus according to claim 9 characterized by that the principal electrodes of the second discharge device are immersed in a gaseous medium.

20. Apparatus according to claim 9 characterized by that the principal electrodes of each of the discharge devices are immersed in a gaseous medium.

21. In combination, in apparatus for supplying a load, a source of periodic potential pulsations, a discharge path having a control electrode, means for connecting said source to said path and said load whereby said potential is impressed across said path, a circuit for producing electrical pulses of duration which are short compared to a period of said source and of a magnitude sufficient to energize said path when the potential of said source is impressed thereacross, said circuit including phase shift means for causing said pulses to be produced at an instant which is displaced from the instant of commencement of a period of the potential of said source by an angle corresponding to the power factor of said load, and means for connecting said circuit to said control electrode at random.

22. In combination, an electric discharge device having a control electrode and a plurality of principal electrodes, impedance means in circuit with said control electrode and one of said principal electrodes through which a current is to be transmitted to control the excitation of said discharge device, a capacitor in circuit with said impedance means and means for transmitting current through said capacitor and said impedance means, the last said means including current rectifying means whereby the capacitor is prevented from being discharged when it is charged by the transmission of current therethrough.

23. In combination, a source of periodic potential, an electric discharge device having a plurality of principal electrodes, means for impressing a potential from said source between said principal electrodes, a second electric discharge device, the last said discharge device having a control electrode and a plurality of principal electrodes, means for impressing potential from said source between the last said principal electrodes which is in opposite phase to the potential impressed between the principal electrodes of said first-named discharge device, a translating device connected to be supplied with current by both said electric discharge devices, a circuit comprising a serially-connected capacitor and resistor which shunt said translating device, and a connection from the common terminal of said capacitor and resistor to the control electrode of said second electric discharge device.

24. Apparatus according to claim 23 in which the first-mentioned electric discharge device is provided with a control electrode, a circuit comprising a capacitor and a resistor supplied with current from said source, and a connection from the common terminal of the last-mentioned capacitor and resistor to the last-mentioned control electrode.

25. Apparatus according to claim 24 in which means are provided for varying the ratio of the relative magnitudes of the last-mentioned resistor and capacitor.

DEWEY D. KNOWLES.